US008476595B2

(12) United States Patent
McKinsey et al.

(10) Patent No.: US 8,476,595 B2
(45) Date of Patent: Jul. 2, 2013

(54) LIQUID XENON GAMMA RAY IMAGER

(75) Inventors: Daniel McKinsey, Hamden, CT (US); Alessandro Curioni, Geneva (CH)

(73) Assignee: Yale University, New Haven, CT (US)

( * ) Notice: Subject to any disclaimer, the term of this patent is extended or adjusted under 35 U.S.C. 154(b) by 403 days.

(21) Appl. No.: 12/803,078

(22) Filed: Jun. 17, 2010

(65) Prior Publication Data

US 2010/0320390 A1    Dec. 23, 2010

Related U.S. Application Data

(60) Provisional application No. 61/218,679, filed on Jun. 19, 2009.

(51) Int. Cl.
*G01T 1/20* (2006.01)
(52) U.S. Cl.
USPC .......................................... 250/366; 250/368
(58) Field of Classification Search
USPC ................ 250/362, 366, 370.09, 368, 370.11
See application file for complete search history.

(56) References Cited

U.S. PATENT DOCUMENTS

| 5,521,386 | A | | 5/1996 | Taboada |
| 5,652,429 | A | * | 7/1997 | Genna ........................... 250/368 |
| 5,665,971 | A | * | 9/1997 | Chen et al. .................. 250/385.1 |
| 6,528,795 | B2 | | 3/2003 | Kurfess et al. |
| 6,770,884 | B2 | | 8/2004 | Bryman |
| 2007/0289975 | A1 | * | 12/2007 | Schmehl et al. .............. 220/582 |

OTHER PUBLICATIONS

Aprile et al., "Observation of anticorrelation between scintillation and ionization for MeV gamma rays in liquid xenon," Physical Review B 76, 014115, pp. 04115-1-04115-7 (Jul. 25, 2007).*

Yamashita et al., "Double phase (liquid/gas) xenon scintillation detector for WIMPs direct search," Astroparticle Physics, Issue 20, pp. 79-84, (2003).*
Dawson et al., "A study of the scintillation induced by alpha particles and gamma rays in liquid xenon in an electric field," Nuclear Instruments and Methods in Physis Research Section A, vol. 545, pp. 690-698 (2005).*
Bolotnikov et al., "Purification techniques and purity and density measurements of high-pressure Xe," Nuclear Instruments and Methods in Physis Research Section A, vol. 383, pp. 619-623 (1996).*
Conti et al., "Correlated fluctuations between luminescence and ionization in liquid xenon," Phys. Rev. B 68, 054201 (2003), The American Physical Society.

(Continued)

*Primary Examiner* — Michael G Lee
*Assistant Examiner* — Suezu Ellis
(74) *Attorney, Agent, or Firm* — Lumen Patent Firm

(57) ABSTRACT

A gamma ray imager includes a chamber containing a scintillation liquid such as xenon and several mutually optically isolated interaction modules immersed in the scintillation liquid within the chamber. Multiple photodetectors optically coupled to the modules separately detect scintillation light resulting from gamma ray interactions in the modules. Charge readout devices coupled to the modules provide time projection chamber-class detection of ionization charges produced by gamma ray interactions within the modules. A signal processor connected to the multiple photodetectors and charge readout devices analyzes signals produced by gamma ray interactions within the modules and calculates from the signals gamma ray energy and gamma ray angle. The calculations use Compton scattering formula inversion and also use anti-correlation of prompt scintillation light signals from gamma ray interactions and charge signals from gamma ray interactions.

13 Claims, 5 Drawing Sheets

OTHER PUBLICATIONS

Aprile et al., "A New Light Readout System for the LXeGRIT Time Projection Chamber," IEEE Transactions on Nuclear Science, vol. 50, No. 5, pp. 1303-1308, Oct. 2003.

Aprile et al., "Spectroscopy and imaging performance of the Liquid Xenon Gamma-Ray Imaging Telescope (LXeGRIT)," SPIE Proceedings vol. 4140, X-Ray and Gamma-Ray Instrumentation for Astronomy XI, pp. 333-343, Dec. 13, 2000.

Aprile et al., "Compton imaging of MeV gamma-rays with the Liquid Xenon Gamma-Ray Imaging Telescope (LXeGRIT)," Nuclear Instruments and Methods in Physics Research Section A, vol. 593, Issue 3, pp. 414-425, Aug. 11, 2008.

Aprile et al., "XENON: a 1 tonne Liquid Xenon Experiment for a Sensitive Dark Matter Search", in Proc. International Workshop on Techniques and Applications of Xenon Detectors (Xenon01), ICRR, Univ. of Tokyo, Kashiwa, Japan, (2001).

* cited by examiner

LIQUID XENON GAMMA RAY IMAGER

CROSS-REFERENCE TO RELATED APPLICATIONS

This application claims priority from U.S. Provisional Patent Application 61/218,679 filed Jun. 19, 2009, which is incorporated herein by reference.

FIELD OF THE INVENTION

The present invention relates generally to methods and devices for ionizing radiation detection. More specifically, it relates to improved techniques for detecting gamma rays using Compton imaging.

BACKGROUND OF THE INVENTION

Compton imaging is a known technique for gamma ray detection that can provide both energy and spatial resolution for gamma rays in the energy range of hundreds of keV to tens of MeV. By detecting kinematically-linked pairs of Compton scatterings and photo-absorption events, both the energy and the trajectory of individual detector-incident gamma rays may be deduced. A Compton imaging detector can be simultaneously sensitive to gamma rays of many different energies, arriving from many different directions.

The basic operating principle of a Compton imager is illustrated in FIG. 1. A gamma ray 100 encounters a scintillation material 106 of the detector where it undergoes Compton scattering in a first interaction 102 and is then absorbed in a second interaction 104. The unknown energy of the incident gamma ray 100 is denoted by $E_\gamma$, and the unknown incident scattering angle is denoted by $\phi$. A Compton imager attempts to determine $E_\gamma$ and $\phi$ from measurements of the energies deposited in the two interactions, denoted by $E_1$ and $E_2$. Specifically, the incident energy $E_\gamma$ of the gamma ray and the Compton scattering angle $\phi$ can be determined from the expressions $$E_y = E_1 + E_2$$

and $$E_2 = \frac{E_y \cdot m_e c^2}{E_y \cdot (1 - \cos\varphi) + m_e c^2},$$

where $m_e c^2$ is the rest energy of the electron (i.e., 0.511 MeV).

In addition to measuring $E_1$ and $E_2$, a Compton imager also needs to measure the corresponding locations $(x_1, y_1, z_1)$ and $(x_2, y_2, z_2)$ of the two interactions. From these locations, the imager can then determine the trajectory 108 relative to which the scattering angle $\phi$ is defined, and thereby determine the orientation and size of a cone 110 whose surface is the collection of all points from which the gamma ray may have originated.

Using knowledge of the energy $E_\gamma$ and the Compton scattering angle $\phi$ for multiple incident gamma rays, a source of gamma radiation can be located, as shown in FIG. 2.

The events can first be partitioned into separate bins according to their energy. For each energy bin, the intersections of the cones are calculated. FIG. 2 shows a two-dimensional cross-section of the cones for events in a single bin, i.e., events having nearly the same energy. For simplicity of illustration, the conic sections are all shown as circles. The solid circles, such as circle 202, intersect at a single point 200, which indicates the location of the source, e.g., inside a vehicle 208. A few other circles, such as circle 204, are randomly distributed and represent stray signals, e.g., due to background radiation. The square 206 represents the detector viewing area.

The performance of a Compton imager depends on many factors including its gamma ray scattering and absorption efficiency and the precision with which it can measure the energies and locations of the gamma ray interactions. These, in turn, all depend on the specific design of the Compton imager, such as the scintillation material used, the technique used for localizing the interactions, and the method used for measuring the energies of the interactions.

Liquid xenon is an advantageous material for many Compton imaging applications because it combines an energy resolution between CdZnTe (CZT) and sodium iodide, the cost of sodium iodide, the position resolution of CZT, and the scalability of organic scintillator. Accordingly, researchers have developed various designs for Compton imaging devices using liquid xenon as the scintillation material. However, there remains a need for Compton imagers that provide better energy and angle resolution than these existing designs.

SUMMARY OF THE INVENTION

According to one aspect, a gamma ray detector is provided that has multiple optically isolated interaction modules so that kinematically-linked pairs of interaction events can be separately detected in distinct modules, thereby allowing the device to take advantage of anti-correlation to improve energy resolution. Thus, when an incident gamma ray produces a first Compton scattering event in a first module and a subsequent absorption event in a second module, the scintillation light and charge measurements from the first event are kept distinct from those of the second event, allowing use of the anti-correlation of the light and charge measurements for each event.

In another aspect, a method is provided for detecting gamma rays. The method includes creating an electric field throughout a chamber which contains a scintillation liquid and multiple optical modules (i.e., two or more) immersed in the scintillation liquid. The optical modules are optically isolated from each other. The method also includes purifying the scintillation liquid to remove contaminants from the scintillation liquid. According to the detection method, a gamma ray interacts with the scintillation liquid in two interactions: in a first interaction the gamma ray interacts with the scintillation liquid in a first of the optical modules, and in a second interaction the gamma ray interacts with the scintillation liquid in a second of the optical modules. A first photodetector or set of photodetectors detects scintillation light resulting from the first interaction in the first optical module, and a second photodetector or set of photodetectors detects scintillation light resulting from the second interaction in the second optical module. Ionization readout devices detect signals from ionization charges produced by the first and second interactions within the first and second optical modules. Signals from the first set and second set of photodetectors and from the ionization readout devices are processed using Compton scattering formula inversion to calculate a gamma ray energy value and a gamma ray angle value for the gamma ray. The processing also uses, for the first interaction and for the second interaction, anti-correlation of charge signals and prompt scintillation light signals for each interaction. In one embodiment, a time between a prompt scintillation light signal and a proportional scintillation light signal is calculated to determine electron drift time and thereby, the event depth z within the optical module.

In another aspect, an apparatus is provided for detecting gamma rays. The apparatus includes a chamber containing a scintillation liquid, a purifier connected to the chamber to remove contaminants from the scintillation liquid, several mutually optically isolated optical modules immersed in the scintillation liquid within the chamber, multiple photodetectors optically coupled to the optical modules to provide detection of scintillation light resulting from gamma ray interactions in the modules, metal conductors positioned around the chamber to create an electrical field within the chamber, charge readout devices coupled to the modules to provide detection of ionization charges produced by gamma ray interactions within the modules, and a signal processor connected to the multiple photodetectors and charge readout devices. The signal processor analyzes signals produced by gamma ray interactions within the modules and calculates from the signals gamma ray energy and gamma ray angle. The calculations use Compton scattering formula inversion and also use anti-correlation of prompt scintillation light signals from gamma ray interactions and charge signals from gamma ray interactions.

The charge readout devices may be, for example, wire grid detectors positioned at ends of the modules, gas electron multiplier detectors, micromesh gaseous structure (micromegas) detectors, or multiple photodetectors used to detect proportional scintillation in gas phase of the scintillation liquid. The multiple photodetectors (e.g., photomultipliers or avalanche photodiodes) may be positioned, for example, at opposite ends of the modules. The charge readout devices are used to determine the x and y locations of the event.

A cryocooler or a storage volume of liquid nitrogen may be used to liquefy and/or cool the scintillation liquid. The scintillation liquid purifier may be a heated getter or a spark purifier. The scintillation liquid is preferably xenon. Activated charcoal may be used in some embodiments to store some of the xenon gas at room temperature. The optical modules may have walls composed of polytetrafluoroethylene.

DETAILED DESCRIPTION

In preferred embodiments of the invention, liquid xenon (LXe) is used as the active scintillation material in a gamma ray imaging apparatus. LXe is a bright scintillator, has high Z (54), has high density (3.0 g cm$^{-3}$) and therefore has high gamma stopping power (5.9 cm attenuation length for 1 MeV gamma rays). With such a short attenuation length, LXe is highly efficient for scattering and capturing gamma rays, thus enabling compact device volume. The use of LXe also allows imagers with homogeneous scintillation material volume to be easily built. Using an electric field, charge produced in LXe by ionizing radiation can be rapidly drifted with a velocity of about 2 mm/μs and detected. Electron drift lengths greater than 2 meters can be obtained with purified LXe.

Figure 1:
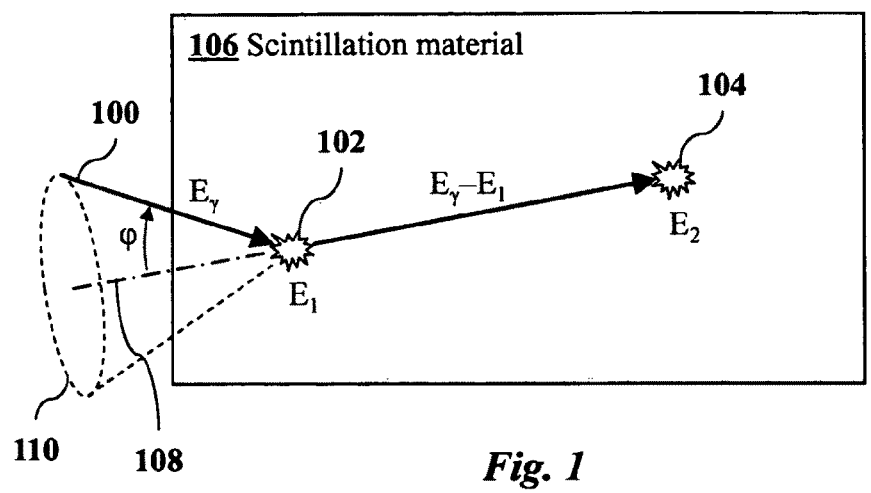
FIG. 1 is an illustration of using Compton imaging to determine an energy and incident angle of a gamma ray from measurements of two interactions in a scattering material.
Figure 2:
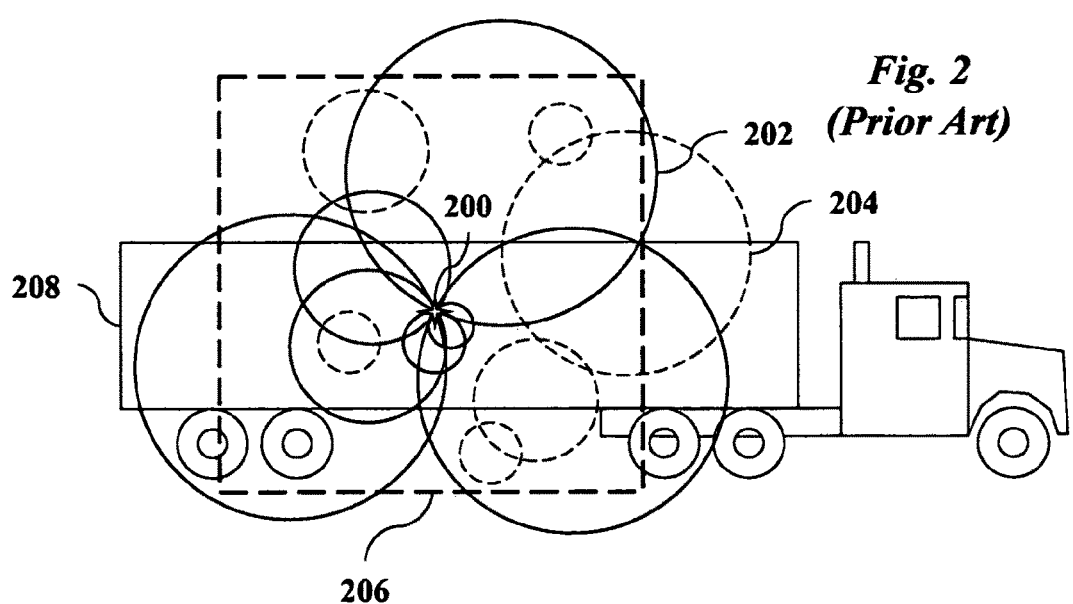
FIG. 2 is an illustration of how Compton imaging uses information from multiple events to locate a source of gamma rays.
Figure 3:
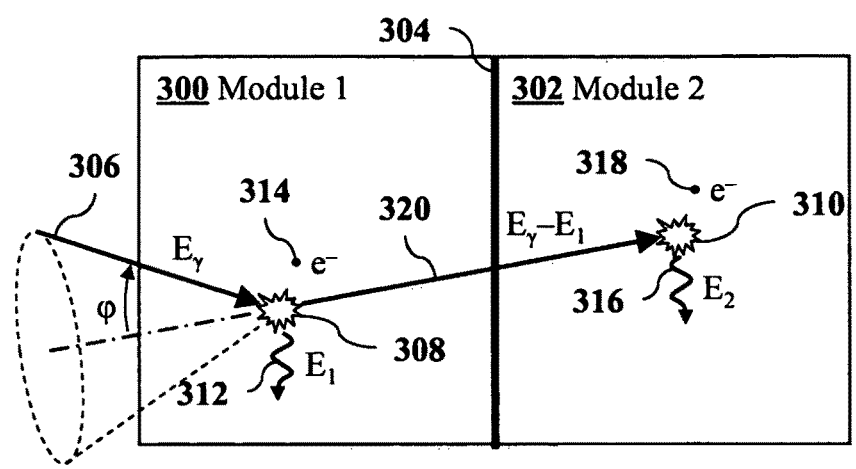
FIG. 3 is a schematic illustration of the use of optically isolated interaction modules to separately detect kinematically-linked gamma ray interactions according to the principles of the present invention.

As shown in FIG. 3, an LXe gamma ray imager according to one embodiment of the invention has a chamber containing a homogeneous LXe volume subdivided by a separator 304 into optically independent scintillation modules 300 and 302. An incident gamma ray 306 enters module 300 producing a first interaction 308 (i.e., Compton scattering), then the scattered gamma ray 320 with reduced energy enters module 302 producing a second interaction 310 (i.e., absorption). The first interaction results in prompt scintillation light 312 of energy $E_1$ and ionization charge 314. The second interaction results in prompt scintillation light 316 of energy $E_2$ and ionization charge 318. The optical isolation of the modules using separator 304 allows the flashes of scintillation light 312 and 316 in distinct modules to be assigned to separate gamma ray interactions. This, in turn, provides excellent energy resolution.

A key feature of the present design is the recognition that separate optical modules allow significantly improved energy resolution. Because scintillation light and charge are anti-correlated for each particular gamma ray interaction, knowledge of the correct linear combination of light and charge allows improved energy resolution, which in turn allows improved angular resolution. Energy resolution and angular resolution are the two technical figures of merit for this technology, and use of separate optical modules can be used to optimize these.

Compton imagers according to the principles of the present invention have two or more optically isolated modules. In selecting the number of modules, there are design trade-offs that depend on various factors such as the target gamma ray energy range. If a fewer number of modules or larger modules are used, it can result in event overlap (i.e., "pileup"). On the other hand, if a large number of smaller modules are used, additional detector electronics are required to handle the larger number of separate channels. The selection of particular number of modules and module size is a design parameter that can be determined by those skilled in the art based on the teachings of the present description.

Device Design

Figure 4A:
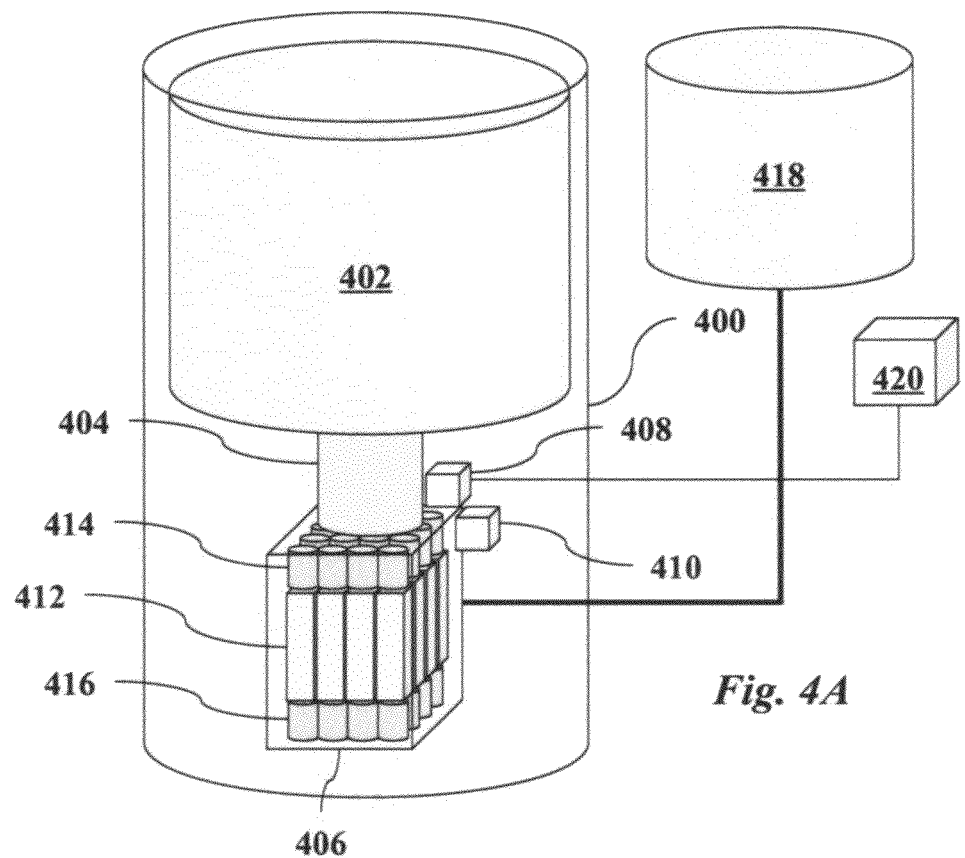
FIGS. 4A and 4B are schematic illustrations of a gamma ray imaging device according to an embodiment of the present invention.

An apparatus for detecting gamma rays according to an embodiment of the invention is shown in FIG. 4A. Inside a thermally insulated container 400 are a liquid nitrogen storage tank 402, a 10 cm×10 cm×20 cm chamber 406 for holding 6 kg liquid xenon, a nitrogen cold head 404 thermally coupled to the chamber 406, electronic feed-throughs 408, and xenon purifier 410 connected to the chamber 406 to remove contaminants from the scintillation liquid. A cryocooler may be used to liquefy and/or cool the scintillation liquid instead of, or in addition to, the storage volume of liquid nitrogen. For LXe, the temperature of 165 K may be maintained by either technique. The thermally insulated container 400 may be a stainless steel vacuum cryostat or foam insulated container. The scintillation liquid purifier may be a heated getter or a spark purifier.

An activated charcoal storage container 418 may be used in some embodiments to store some of the xenon gas at room temperature when the device is not operating, or in the event of a power failure. For example, at a pressure of 2 bar, Calgon OVC 4×8 coconut charcoal, which is used to trap Xe-135 gas in nuclear reactors, can store about 0.2 grams of xenon per milliliter of charcoal. This is much higher than the xenon density that would be achieved with a simple storage bladder or low pressure tank. Before loading with xenon, the charcoal can be baked in vacuum to remove any air or other contaminants. The charcoal-filled xenon storage volume may be connected to the LXe detector with simple vacuum plumbing. When desired, the xenon may be removed from the charcoal simply by heating it. When the LXe gamma ray imager is connected to a power source, the charcoal can be heated and the LXe detector cooled, thereby liquefying the xenon into the detector. Once the detector is full, an automatic valve may be used to isolate the charcoal from the cryogenic volume. If the detector warms, an automatic valve or burst disk can open to expose the room-temperature charcoal to the xenon, safely removing the xenon and storing it for later use.

The chamber 406 contains the xenon scintillation liquid and several mutually optically isolated optical modules 412 immersed in the scintillation liquid. The optical modules may be optically isolated by 5 mm thick walls composed of polytetrafluoroethylene (PTFE) which is highly reflective at the LXe scintillation wavelength of 175 nm. Top and bottom photodetector arrays 414 and 416 are optically coupled to the optical modules 412 to provide detection of scintillation light resulting from gamma ray interactions in the modules. The multiple photodetectors may be, for example, photomultipliers (e.g., Hamamatsu R8778 5-cm diameter photomultipliers) or avalanche photodiodes. The photodetectors are each fitted with a quartz window to allow efficient scintillation detection.

Time projection chamber-class detection of ionization charges produced by gamma ray interactions within the modules is provided using charge readout devices, as will be described in more detail below. Signals produced by gamma ray interactions within the modules are produced by the charge readout devices and photodetectors and sent via the electronic feed-throughs 408 to a signal processor or computer 420 that calculates from the signals gamma ray energy and gamma ray angle. The calculations use Compton scattering formula inversion and also use anti-correlation of prompt scintillation light signals from gamma ray interactions and charge signals from gamma ray interactions.

Figure 4B:
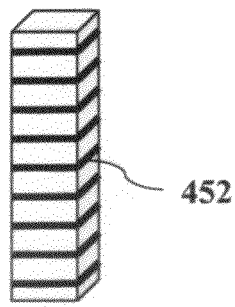

FIG. 4B shows a single optical module 450 which has metal ring conductors 452 positioned around the chamber and/or module walls help create and shape an electrical field throughout the xenon within the chamber. In a preferred embodiment, a series of metal rings spaced 1 cm apart are mounted just outside the PTFE walls to define an electric field of 1 kV/cm within the LXe.

Figure 5A:
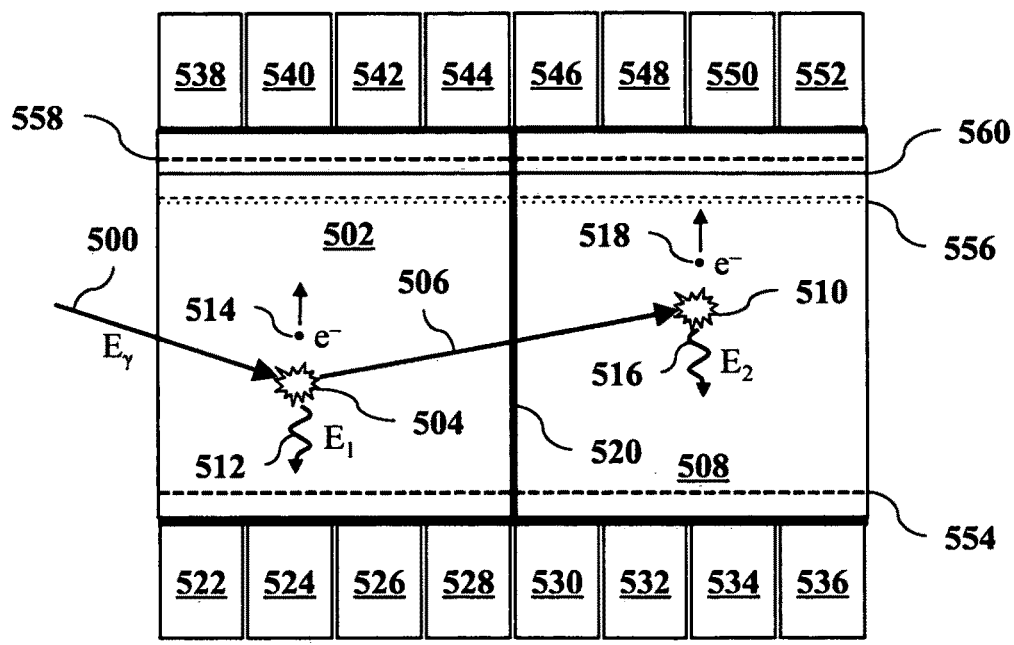
FIGS. 5A and 5B are cross-sectional views of a pair of optically isolated interaction modules used to detect scintillation light and ionization charges from gamma ray interactions according to an embodiment of the present invention.

FIG. 5A is a cross-sectional view of two adjacent optical modules of the device shown in FIG. 4A. A gamma ray 500 entering a first module 502 undergoes Compton scattering in a first interaction 504. The scattered gamma ray 506 then enters a second module 508 and is absorbed in a second interaction 510. The first interaction 504 results in a prompt scintillation light 512 and ionization charge 514. Similarly, the second interaction 510 results in a prompt scintillation light 516 and ionization charge 518. Because the two modules are optically isolated by separator 520, the prompt scintillation light 512 in the first module 502 is discriminated from the prompt scintillation light 516 in the second module. An array of photodetectors 522, 524, 526, 528 optically coupled to the bottom of the module 502 is used primarily to detect the prompt scintillation light 512 from the first interaction 504.

Similarly, an array of photodetectors 530, 532, 534, 536 optically coupled to the bottom of the module 508 is used primarily to detect the prompt scintillation light 516 from the second interaction 510.

The gamma-produced ionization charges 514 and 518 are drifted upward using an electric field generated in part by field shaping rings (not shown) and a cathode grid 554 maintained at roughly −10 kV near the bottom of the modules. The drifted charges 514 and 518 are detected using a time projection chamber-class readout. In this embodiment, the charge readout devices are implemented using orthogonal wire grid detectors 556 maintained near 0 V and positioned at upper ends of the modules. The wire grids 556 measure the x-y interaction position of the drifted charge clouds with submillimeter resolution, providing excellent gamma ray angular resolution.

Figure 5B:
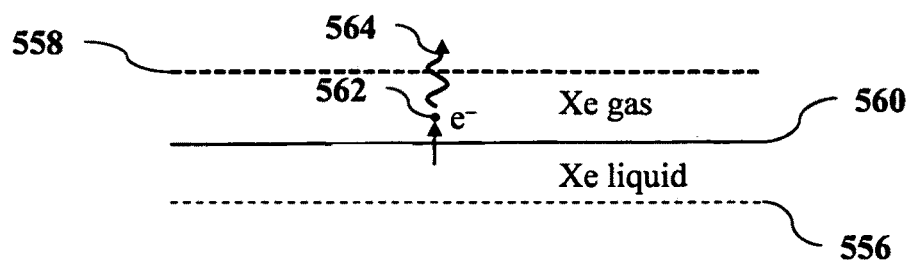

A two-phase liquid-gas xenon interface 560 is maintained near the top of each optical module. Capacitive level meters allow precise measurement of the LXe level. A strong electric field generated by the proportional scintillation grid 558 maintained at +8 kV extracts the ionization electrons 514 and 518 from the liquid into the gas where they are amplified via proportional scintillation. FIG. 5B is a detailed view of the liquid-gas interface 560 with the proportional scintillation grid 558 above and the charge readout grids 556 below. The strong electric field extracts a charge 562 from the liquid phase of the xenon through the interface 560 into the gas phase of the xenon. Once in the gas phase, the charge 562 undergoes proportional scintillation in the gas, producing proportional scintillation light 564. Returning back to FIG. 5A, the proportional scintillation light from charge 514 is detected using an array of photodetectors 538, 540, 542, 544. Similarly, the proportional scintillation light from charge 518 is detected using an array of photodetectors 546, 548, 550, 552. For each interaction, the timing of the proportional scintillation signal relative to the prompt scintillation signal provides charge drift time information which is then used to determine the z coordinate of the interaction location.

In a variant of this embodiment, charge readout can be implemented using the photodetector arrays 538-552 at the top of the modules instead of the wire grid detectors 556. The photodetector arrays 538-552 are thus used for both charge drift time measurement and x-y charge readout position. Since electron diffusion in LXe is small, the proportional scintillation pulse is produced in a small spot with the same x-y coordinates as the interaction site, allowing 2D localization with an accuracy of 1 cm based only on the pattern of photomultiplier tube (PMT) illumination. The photodetector arrays above the liquid surface are primarily used to image the x-y position of the proportional light pulse. The second PMT array is in the liquid, below the cathode grid. Because of internal reflection at the liquid surface (LXe has a high refraction index of 1.69), most prompt light is collected in this bottom array.

In another embodiment, liquid phase xenon fills the entire module and the gas phase is not used for proportional scintillation. Both charge position and timing readout are provided by the wire grid detectors. The top photodetector arrays may then be used for detection of the prompt scintillation light. This detector design can be useful in applications where the imager is moving or vibrating enough to disrupt the liquid-gas interface.

Operation

In operation, the apparatus is filled with purified liquid xenon and an electric field is established throughout the chamber. The photodetectors and wire readouts are energized. During operation, the liquid xenon is purified to remove contaminants from the scintillation liquid. For example, the xenon may be continuously boiled, purified and re-liquefied during operation to maintain a sufficiently long electron drift length. Electronegative and molecular impurities that affect charge and light collection may be removed using gas-phase recirculation through a commercial heated getter.

The typical LXe operating temperature is 175 K, at which the Xe vapor pressure is about 1.8 atm. Liquid nitrogen is kept in a storage volume above the LXe detector and constantly drips into a copper cold head, where the nitrogen boils and passes through a simple heat exchanger. The nitrogen gas passes out of the cold head, through a mass flow controller and is vented. The mass flow controller allows the nitrogen gas flow to be varied, which in turn varies the cooling power of the cold head. Heaters on the cold head, combined with diode thermometers, maintain the temperature of the LXe detector within 0.1 K. In between daily liquid nitrogen fills, the detector may be transported to wherever it is needed.

An incident gamma ray is detected when it interacts with the scintillation liquid in two interactions which take place in two different optical modules. Gamma rays that have just one interaction or that interact twice in the same module are discarded events. A first photodetector or set of photodetectors detects scintillation light resulting from a first interaction in a first optical module, and a second photodetector or set of photodetectors detects scintillation light resulting from a second interaction in a second optical module distinct from the first. Charge readout devices detect signals from ionization charges produced by the first and second interactions within the first and second optical modules.

Signals from the first and second sets of photodetectors and from the charge readout devices are processed and analyzed in real time. Photomultiplier signals may be acquired using waveform digitizers. Events that trigger PMTs in both scintillation volumes are analyzed for gamma ray energy and scattering angle. Gamma rays that immediately photoabsorb in one module will not trigger the detector. Gamma rays that Compton scatter in both optical volumes (less common because of the high Z of xenon) will contribute a background of unresolved events. For a gamma ray that scatters in one scintillation module and is absorbed in the second, the Compton scattering formula may be inverted to determine the gamma ray scattering angle. By knowing the scattering energy and position of each event, the trajectory and energy of the gamma ray may be determined. The maximum time between the pulses is the maximum electron drift time of 50 µs, for a saturated electron drift velocity of 2 mm/µs in LXe. For optical module masses up to 20 kg, we estimate that event pileup (dominated by natural radioactivity in the local environment) will not be an issue when operating the detector in a passive imaging mode.

Energy resolution is achieved through measurement of the prompt light signal in combination with the proportional light signal. Compton scattering formula inversion is used to calculate a gamma ray energy value and a gamma ray angle of incidence for the gamma ray. In one embodiment, a time between a prompt scintillation light signal and a proportional scintillation light signal is calculated to determine electron drift time. Sources of gamma rays within several hundred meters may be imaged with energy resolution by analyzing the resulting scintillation and ionization signals.

Because the signals in separate modules are isolated from each other, the processing of the signals for each interaction takes advantage of anti-correlation of charge signals and prompt scintillation light signals to achieve extremely good energy resolution in LXe. This technique is based on the highly significant recent discovery of anti-correlation of charge and scintillation light. The ionization and scintillation yields of LXe are accompanied by fluctuations that are much larger than predicted by Poisson statistics, and because scintillation light results from charge recombination, scintillation light and charge are anti-correlated. Consequently, combining the signals from charge and scintillation light in the appropriate linear combination yields much better energy resolution than can be achieved by measuring either quantity alone. Techniques of present invention leverage this insight through the use of optically isolated interaction modules.

Figure 6:
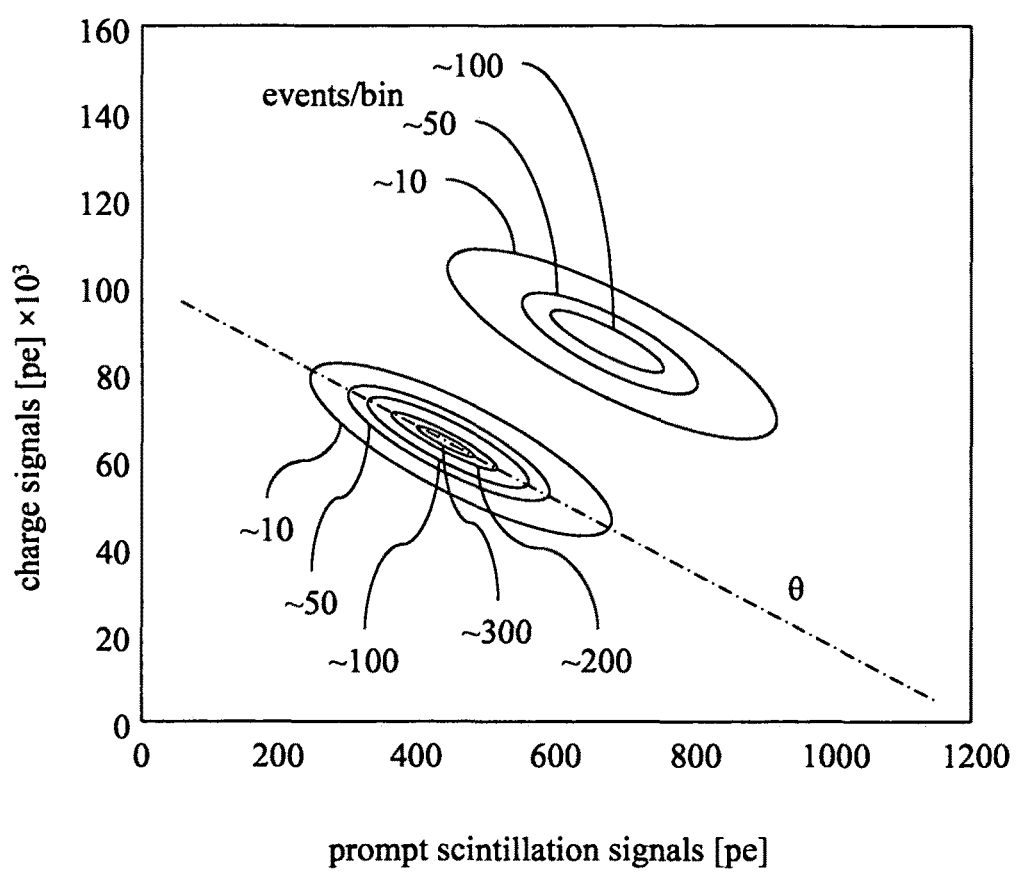
FIG. 6 is a plot of charge signal vs. prompt scintillation signal for events detected in an optically isolated interaction module, showing anti-correlation of charge and scintillation signals according to an embodiment of the invention.

FIG. 6 is a plot of charge signals vs. prompt scintillation signals produced by 164 keV and 236 keV gamma rays emitted by radioactive Xe-129m and Xe-131m atoms. The slanted ellipses produced by these monoenergetic events provide a quantitative measure of the charge-light anti-correlation, parameterized by the variable $\theta$. Use of the correct linear combination of light and charge allows one to achieve an energy resolution corresponding to the width of the narrow dimension of the ellipse.

Performance

The performance of detectors of the present invention may be illustrated by way of the following concrete example. We consider an apparatus with a 20 cm×20 cm×20 cm cubic instrumented detector volume containing 24 kg LXe subdivided into 16 independent scintillation modules, with 5 mm-thick teflon walls to ensure good light collection. There are 16 PMTs each with 5 cm diameter positioned on top of each module and 16 PMTs on the bottom of each module. Wire readouts are made of two planar wire grids, 64 wires each with 3 mm wire spacing. Charge and light signals are read out by wire grids and photomultipliers, respectively.

The position resolution for individual scattering and absorption events is designed to be 1 mm in x, y, and z. In operation, the first interaction and the second interaction of detectable events occur in different scintillation modules, to ensure that the best energy resolution applies to each interaction. In this example, the size of the optical modules is optimized to give the best efficiency for capturing and imaging 1001 keV gamma rays. For a normally incident 1001 keV gamma ray, the efficiency for producing an imaged event is extraordinarily high, at about 30%. This is due to the high LXe stopping power and the large Xe photoabsorption cross-section. For a 2 kg piece of HEU at a distance of 3 meters, the detector can detect 120 gamma rays at 2614 keV and 20 gamma rays at 1001 keV during a 20 second dwell time. Over the same dwell time period, the background from natural radioactivity would only be 0.5 events. With a cryocooler option instead of nitrogen, the device is estimated to use approximately 400 W of electrical power while in operation. This includes power for cooling, as well as power for the electronics. Instead of using a vacuum dewar for thermal insulation, a practical device for field use may instead employ polyurethane foam or similar insulation. We estimate that an additional 20 W of cooling power would be needed with 7.5 cm of thermal insulation. Because of its low density, the foam would not significantly attenuate gamma rays.

This example should not be interpreted as indicating any fundamental limits on the performance of a LXe gamma ray color cameras according to the present invention. Improved light detection, for example, would translate immediately into improved energy resolution, and position resolution can be improved by reducing the wire pitch of the time projection chamber readout, or exploiting newly developed charge readout devices (e.g., gas electron multipliers or micromegas detectors). Moreover, LXe detectors could be built with even larger gamma ray collection apertures. The instrument in the example above has a 400 cm² aperture (20 cm×20 cm), but instruments with many square meter apertures may also be envisioned. With appropriate segmentation, such a device should not have any significant dead time issues in passive imaging mode, but would be able to collect and image gamma rays very effectively, allowing detection of smaller sources of radioactivity at larger standoff distances.

Applications

Detectors of the present invention have diverse applications including medical imaging and basic science. The use of liquid xenon in PET medical imaging promises to dramatically improve position resolution. The excellent timing, position and energy resolution, large light output as well as the high density and high Z of xenon prove to be very useful in this application. Liquid xenon PET imaging (LXePET) based on Compton scattering permits unprecedented position resolution. Two-phase Compton imagers of the present invention can improve position and energy resolution for medical imaging, which will result in better localization of the emitting malignant cell(s). The application of a two-phase (liquid/gas) Compton imager will substantially improve medical PET imaging.

One important application of the techniques of the present invention is the optimal detection of special nuclear materials (SNM) in passive search mode. This application involves imaging and precisely locating sources of gamma radiation. A key consideration is distinguishing SNM sources from natural background signals. Angular and energy resolution both assist in this discrimination. Imaging capability, which allows discrimination of signals by their angle of incidence, lowers the background rate in proportion to the solid angle resolution of the imager. This is important because natural radioactive backgrounds can vary substantially with time and location, so an increase in overall gamma detection rate does not necessarily imply a concentrated source of radioactivity. Good angular resolution also allows one to more readily locate the source of radiation after it is initially detected, since the detector innately "points" to the source. Good energy resolution is also valuable because SNM contain isotopes that emit gamma rays of characteristic energies. A gamma ray detector with both good energy resolution and imaging capability offers the highest-attainable performance for locating interesting radioactive sources quickly at long range. In passive search mode, no additional radiation sources are needed to detect the presence of SNM, so there is no danger of harming bystanders or cargo. If a statistically significant number of gamma rays, at energies characteristic of SNM, are detected in a small spatial area, then the cargo container or vehicle exhibiting this excess can be searched more thoroughly for SNM, using active interrogation or other means.

For highly enriched uranium (HEU), two particular gamma rays of interest are the 1001 keV line from Pa-234m in the U-238 decay chain, and the 2614 keV line from U-232 impurities. All reprocessed uranium (including most US and Russian HEU) contains U-232 impurities, at a typical level of 100 parts per trillion. At this U-232 impurity level, 2 kg of HEU emits 60,000 gamma rays per second at 2614 keV. The Pa-234m emits 8,000 gamma rays per second at 1001 keV. While both of these gamma ray lines are found in natural radioactivity, they are significantly more concentrated in HEU than in typical rock. U-235 emits gamma rays at 186 keV; however these are easily shielded by a small thickness of lead or other metal. For HEU that is not reprocessed, the 2614 keV line is not particularly intense; still, the gamma rays at 1001 keV and other characteristic energies can be used to locate and positively identify a spatially concentrated source of uranium.

For a detector that simply counts gamma rays with good energy resolution and no angular resolution, a few kg of HEU just a short distance away will be swamped by natural radioactivity from uranium in the local environment. But if the detector can image the gamma rays from the HEU, then the gamma ray spatial concentration will allow detection over natural background. Weapons-grade plutonium is significantly easier to see above natural background than HEU, as the gamma ray emission is very intense (150,000 gamma rays per second per kg above 1 MeV, and about 900,000 per second per kg between 600 and 800 keV).

The invention claimed is:

1. An apparatus for detecting gamma rays, the apparatus comprising:
    a chamber containing a scintillation liquid;
    a purifier connected to the chamber to remove contaminants from the scintillation liquid;
    multiple optical modules positioned within the chamber, wherein the modules are immersed in the scintillation liquid, wherein the multiple optical modules are optically isolated from each other;
    multiple photodetectors optically coupled to the modules to provide detection of scintillation light resulting from gamma ray interactions in the modules;
    metal conductors positioned around the chamber to create an electrical field within the chamber;
    charge readout devices coupled to the modules to provide time projection chamber-class detection of ionization charges produced by gamma ray interactions within the modules;
    a signal processor connected to the multiple photodetectors and charge readout devices, wherein the signal processor analyzes signals produced by gamma ray interactions within the modules and calculates from the analyzed signals a gamma ray energy value and a gamma ray angle value by Compton scattering formula inversion and using anti-correlation of prompt scintillation light signals from gamma ray interactions and charge signals from gamma ray interactions.

2. The apparatus of claim 1 wherein the charge readout devices are wire grid detectors positioned at ends of the modules, gas electron multiplier detectors, micromegas detectors, or the multiple photodetectors used to detect proportional scintillation in gas phase.

3. The apparatus of claim 1 wherein the multiple photodetectors are positioned at opposite ends of the modules.

4. The apparatus of claim 1 wherein the multiple photodetectors are photomultipliers or avalanche photodiodes.

5. The apparatus of claim 1 further comprising a cryocooler to liquefy the scintillation liquid.

6. The apparatus of claim 1 further comprising a storage volume of liquid nitrogen to cool the scintillation liquid.

7. The apparatus of claim 1 wherein the purifier is a heated getter or a spark purifier.

8. The apparatus of claim 1 wherein the scintillation liquid is xenon.

9. The apparatus of claim 1 further comprising activated charcoal to store xenon gas at room temperature.

10. The apparatus of claim 1 wherein the modules have walls composed of polytetrafluoroethylene.

11. The apparatus of claim 1 wherein the signal processor measures a time between a prompt scintillation light signal and a proportional scintillation light signal to determine electron drift time.

12. A method for detecting gamma rays, the method comprising:

creating an electric field throughout a chamber containing a scintillation liquid, a first optical module immersed in the scintillation liquid, and a second optical module immersed in the scintillation liquid, wherein the first and second optical modules are optically isolated from each other;

purifying the scintillation liquid to remove contaminants from the scintillation liquid;

interacting a gamma ray with the scintillation liquid; wherein the interacting comprises a first interaction of the gamma ray with the scintillation liquid in the first optical module and a second interaction of the gamma ray with the scintillation liquid in the second optical module;

detecting with a first photodetector or set of photodetectors scintillation light resulting from the first interaction in the first optical module;

detecting with a second photodetector or set of photodetectors scintillation light resulting from the second interaction in the second optical module;

detecting with charge readout devices ionization charges produced by the first and second interactions within the first and second optical modules;

processing signals from the first and second sets of photodetectors and from the charge readout devices to calculate a gamma ray energy value and a gamma ray angle value, wherein the processing uses Compton scattering formula inversion, and wherein the processing uses, for the first interaction and for the second interaction, anti-correlation of charge signals and prompt scintillation light signals.

13. The method of claim 12 wherein the processing comprises calculating a time between a prompt scintillation light signal and a proportional scintillation light signal to determine electron drift time.

* * * * *